United States Patent
Haupt

[19]

[11] Patent Number: 6,006,877
[45] Date of Patent: Dec. 28, 1999

[54] HYDRAULIC CLUTCH FOR HIGH FRICTION APPLICATIONS

[75] Inventor: Josef Haupt, Tettnang, Germany

[73] Assignee: ZF Friedrichshafen AG, Friedrichshafen, Germany

[21] Appl. No.: 09/101,228

[22] PCT Filed: Jan. 25, 1997

[86] PCT No.: PCT/EP97/00343

§ 371 Date: Jul. 2, 1998

§ 102(e) Date: Jul. 2, 1998

[87] PCT Pub. No.: WO97/28389

PCT Pub. Date: Aug. 7, 1997

[30] Foreign Application Priority Data

Feb. 1, 1996 [DE] Germany .......................... 196 03 596

[51] Int. Cl.$^6$ .................................................. F16H 45/02
[52] U.S. Cl. ................................. 192/3.29; 192/113.34
[58] Field of Search .......................... 192/3.28, 3.29, 192/113.3, 113.34, 54.3

[56] References Cited

U.S. PATENT DOCUMENTS

| | | | |
|---|---|---|---|
| 4,462,492 | 7/1984 | Mueller | 192/3.29 |
| 4,674,616 | 6/1987 | Mannino, Jr. | 192/107 R |
| 4,930,608 | 6/1990 | Schenk et al. | 192/3.29 |
| 5,209,330 | 5/1993 | MacDonald | 192/3.29 |
| 5,248,016 | 9/1993 | Umezawa | 192/3.28 |
| 5,310,033 | 5/1994 | Shibayama | 192/3.29 |
| 5,669,474 | 9/1997 | Dehrmann et al. | 192/3.29 |
| 5,732,804 | 3/1998 | Wienholt | 192/3.29 |
| 5,799,763 | 9/1998 | Dehrmann | 192/3.29 |

FOREIGN PATENT DOCUMENTS

| | | |
|---|---|---|
| 44 20 959 A1 | 1/1995 | Germany . |
| 44 23 640 A1 | 6/1995 | Germany . |
| 195 08 855 A1 | 4/1996 | Germany . |
| 2 280 733 | 2/1995 | United Kingdom . |

OTHER PUBLICATIONS

Dipl. –Ing. (FH) W. Forte, "Betriebs–und Leerlaufverhalten von naBlaufenden Lamellenkupplungen", VDI Berichte. Nr. 649, 1987, pp. 335–358.

*Primary Examiner*—Charles A Marmor
*Assistant Examiner*—Saúl Rodríguez
*Attorney, Agent, or Firm*—Davis and Bujold

[57] ABSTRACT

In hydraulic clutches (1) generating high levels of heat, the problem is to ensure a rapid and even heat dissipation over the entire friction surface and an oil flow rate which is independent of the wear of the hydraulic clutch (1) and largely independent of the actuating pressure. The problem is solved as follows: at least one restrictor (1/6) is located in and/or between the lining supports or discs (1/5) of the hydraulic clutch (1) and acts independently of the wear and machining inaccuracy of the lining grooves (1/7, 1/8) of the lining supports (1/3, 1/4). This ensures an optimal throughflow and an oil flow rate that is independent of wear. The independence of wear results from the fact that the flow resistance is determined solely by the through-apertures (1/6) in the lining support (1/5), the flow cross section of the grooves (1/7, 1/8) being several times greater than that of the through-apertures (1/6). If one or more oil ducts are enclosed on the side remote from the lining by two or more steel discs (1/9, 1/10) which do not move relative to each other, the flow rate is independent of wear, since the oil ducts or the flow cross sections are not affected by the wear. Independence from the actuating pressure and engine speed is ensured by flow rate limitation.

6 Claims, 5 Drawing Sheets

HYDRAULIC CLUTCH FOR HIGH FRICTION APPLICATIONS

The invention concerns a hydraulic clutch.

BACKGROUND OF THE INVENTION

Since the introduction of automatic transmissions, hydrodynamic torque converters have been the connecting link between a prime mover and the transmission proper. Because of the slip, a converter makes a comfortably smooth start possible. At the same, it time absorbs irregularities in the rotation of the combustion engine. Additionally, a great starting torque is made available by the torque increase conditioned by principle.

Strictly speaking, a converter generally comprises a converter housing, an impeller, a stator and a turbine wheel. Because of the torque being transmitted by the hydrodynamic forces from the impeller, via the stator, to the turbine wheel, slip results between the impeller and the turbine wheel. This causes a loss in efficiency.

To improve the efficiency, a bridge clutch was introduced which bridges the converter at certain rated speeds. The bridge clutch can be fitted before the turbine wheel, that is, between the converter housing and the turbine wheel, or behind the impeller, that is, between the impeller and another transmission unit.

The bridge clutch's disadvantage is the loss of the absorption of the vibration generated by the differential speed between the turbine wheel and impeller. To compensate for this, an additional shock absorber must be applied or the clutch itself must be designed as a shock absorber.

As a consequence of limited space conditions within the converter and of the complicated vibration systems of an automatic transmission, mechanical torsional shock absorbers cannot be designed so that the bridge clutch can be engaged already at low engine speeds and in the lower gears. Otherwise low, dull booming sounds will emanate throughout the body. In modern torque-optimized engines with high engine torques, at speeds slightly above the idling speed rigid power trains must already be used to prevent twisting thereof. Thereby the inherent frequency is moved to higher speeds, thus intensifying the problem of booming noises in the body.

Powerful transverse engines, having great capacity, increasingly require a narrow converter design. A mechanical torsion absorber thus creates considerable problems.

A bridge clutch, with regulated slippage, already makes engaging the converter at low driving speeds possible, absorbing the vibrations in critical speed ranges by the bridge clutch slip, reducing the cost of the torsional shock absorber and further reducing the consumption of benzene.

Torsional vibrations are generated in the drive train as a result of an angular acceleration of the crankshaft followed by a delay due to the compression in the next cylinder during each ignition of the combustible mixture in a cylinder. The angular speed thereby fluctuates between a maximum and a minimum.

As the engine speed increases, the torsion irregularity decreases proportionally 1/n. At a speed of typically about 2,000 1/min, values of speed fluctuation are reached which scarcely decrease further as the engine speed increases. The curve of the angular deflection is proportionally 1/n while the vibration range of the angular acceleration is almost independent of speed. Because of this, as a rule, above about 2,000 engine revolutions the bridge clutch can remain engaged during traction operation. Below 2,000 engine revolutions, the torsion irregularity suddenly increases so that the bridge clutch must be operated disengaged or adjustedly slipping.

During the engine coasting operation, the gas pressure in the cylinder is substantially less than during a traction operation, whereby the critical range moves to higher speeds. The vibration range of the angular acceleration thereby intensively increases as the engine speed increases. Body booms in the overrun are therefore detected mostly at speeds way above 2,000 1/min. For a comfortable drive the bridge clutch must, in this case, be disengaged or regulated.

In order to achieve a sufficient absorption of the torsion vibration, a slip of up to about from 2% to 3% is needed. A slip or more than from 2% to 3% hardly produces any further increase in absorption.

If the interior of the converter is divided in two spaces by a piston of the hydraulic clutch (a smaller space between the hydraulic clutch piston and the converter housing and a larger space between the piston and the impeller being thus formed) the regulation can be obtained by passing an increased pressure into the turbine space of the pump and adjustedly controlling the pressure in the clutch piston space of the converter lid.

In addition, regulation can be achieved by venting the small converter space and adjustedly controlling the pressure of the pump and the turbine space.

A switching logic for a bridge clutch can look, for example, as if a control pressure acts upon valves which then vent a line to the smaller converter space and pass the main pressure into the larger converter space whereby the piston of the bridge clutch is engaged.

Control of the bridge clutch is obtained by a pressure control function resulting from a force balance of control pressure, spring tension and operative regulating pressure of a differential piston. To adjust a constant differential speed on the bridge clutch, the clutch pressure is adjusted proportionally to the torque by the control pressure.

A function of the regulated bridge clutch is to absorb, by as small a slip as possible, the torsional vibrations in the input so that no booming or humming can be heard.

This can be achieved, for example, by determining the slip required by characteristic lines which are determined by tests of the specific vehicle engine, or the slip depending on rotational irregularities, or the slip acts based on a constant nominal value which is fed to a control circuit.

The stated basic problem consists in controlling the high frictions appearing in bridge clutches.

Additionally, the problem is made worse by new driving strategies in which the bridge clutch, already in the range of high conversions, is engaged in order to save fuel and improve driving properties such as the direct response to a change of the accelerator pedal position.

The problem of higher friction work is in the considerations regarding substituting a hydraulic starting clutch for a converter.

The friction value cover is determined by the oil and the friction lining.

If, in one area of the bridge clutch, a temperature peak is reached which leads to oil damage, the friction value curve is thereby changed and as the slip increases the friction value m decreases in comparison to the normal rising curve.

As a result, the increase of the slip is no longer compensated by a simultaneous increase of the friction value, so no stable operating point appears. Also, friction vibrations can generate due to damaged oil.

Therefore, the problem basically consists in locally preventing high temperature peaks and altogether keeping the temperature below the critical temperature at which the oil will be damaged.

It is known to provide friction linings with grooves of different kinds and to cool them with the largest possible oil current passed through the grooves. With the guided structure of the shape of the grooves, an even high heat dissipation is obtained (see VDI-Report No. 649, 1987, pp. 335–358).

In cases of high heat development, the heat is not sufficiently dissipated in all zones of the friction lining, since the friction lining is not sufficiently flowed through. The temperature peaks caused thereby damage the oil.

Besides, the flow rate of the oil depends on the wear of the friction linings since the through flow cross section of the grooves decreases with the wear of the friction lining.

Moreover, the flow rate of the oil depends on the actuating pressure of the bridge clutch whereby, at elevated actuating pressures, the pressure effective for the contact force drops and the transmissible forces of the bridge clutch becomes weaker.

Therefore, the problem to be solved by the invention is to enable a high and even heat dissipation over the whole friction surface and permit an oil flow rate independent of the wear of the bridge clutch and largely of the actuating pressure.

SUMMARY OF THE INVENTION

At least one restrictor is positioned in and/or between the lining supports or the discs of the bridge clutch. It acts independently of the wear or of the machining accuracy of the lining grooves of the friction linings, and makes it possible to achieve an optimal flow rate independent of the wear.

The independence from wear and from the machining accuracy of the lining grooves results from the fact that the flow resistance is determined solely by the through-apertures in the lining supports which separately or jointly form a restricting point, with the flow cross section of the grooves in the friction lining being many times larger than that of the through-apertures.

If one or more oil ducts are each enclosed on the side remote from the lining by two or more adjacent discs, which do not move relative to each other, the flow rate is independent of the wear, since the oil ducts or the flow cross sections are not affected by the wear.

By radially feeding the oil through an oil guidance system determined by the grooves and restrictors to one side of the lining support or one side of a disc, and radially dissipating it to one side, an optimal through flow can be achieved. Thus, for example, the oil once or repeatedly radially supplied from above or below through the lining support or through the disc again can be passed from one side to the other and then be radially dissipated again. A high and even heat dissipation is made possible by such an oil guidance.

If all the friction linings, which can consist of homogeneous material or also of composite materials of different heat conductivities, have a uniform shape the advantage results that the production costs can be reduced since a uniform manufacture with larger number of parts is made possible.

To make this possible, the friction linings have a structure such that when two friction linings are rubbed against each other they form an oil guidance system.

By the friction linings having grooves that are open to the outside and are closed to the inside and grooves that are closed to the outside and are open to the inside, which in addition are regularly or irregularly distributed over the periphery, it becomes possible that at certain turning angles of the two friction linings relative to each other an oil guidance system can be formed which, in the presence of a restrictor in the lining support or in the disc, supplies the oil to one side and dissipates it to the other side.

By having a homogeneous friction lining, several oil guidance systems can also be formed by designing the structure so that with different turning angles different systems result. This is advantageous in that the oil guidance system can be adjusted to the required heat dissipation.

A still larger number of oil guidance systems results when using two different friction linings which differ in shape and possibly in their material composition.

With different friction linings it is possible, like in the uniform friction lining, to use different turning angles to form different oil guidance systems.

If, in the area of the oil guidance, a flow rate limitator is inserted, it becomes possible for the oil flow rate to be independent of actuating pressure and independent of the speed of the bridge clutch.

To achieve this objective, the flow rate limitator can be formed, for example, by one or more flat springs.

The flat springs can be fitted in recesses on the external periphery on the oil feeding side of the lining support or the disc so that one end is firmly attached to the lining support or the disc, for example, by spot welding or riveting, with the other end being movable point in the direction of a through-aperture in the lining support or the disc, and needs only one bend of the flat spring in order that its transverse axis be lifted by the lining support or the disc. The flat spring is mounted so that when it has no bend it partly covers the through-aperture. Alternatively, the fixed end can be toward the edge or toward the center of the lining support or of the disc.

If there is an increase of the pressure drop which is dependent on the flow rate of the oil through the through-aperture, between the oil feeding and the oil dissipating sides of the lining support or of the disc, a force generates which acts upon the movable end of the flat spring, in the direction of the lining support or the disc, and thus the through-aperture wears away around part of the cross section. The flow rate is thus limited at high pressures. In addition, the constantly open part of the cross section of the through-aperture ensures a minimum through flow of the clutch.

The flat spring must be designed so that no step function generates. This would have a negative effect on the control of the clutch.

Therefore, a regulation of the flow rate independent of the speed is obtained with such a construction. Besides, in the flat spring described, almost no friction hysteresis appears, the construction is of reasonable cost, and great operational safety is obtained by a partial cross section of the through-aperture always remaining open even when the flat spring no longer opens the through-aperture. A minimal cooling is thus always ensured.

An embodiment of the invention is shown in the drawing.

In the specification numerous features are shown and described in combination.

The expert will conveniently regard the features separately and make logical combinations.

BRIEF DESCRIPTION OF THE DRAWING(S)

DESCRIPTION OF THE PREFERRED EMBODIMENT(S)

FIG. 1

A hydrodynamic unit, in the form of a converter 2, serves as a starting unit. Said unit comprises an impeller 2/3 which is driven by an engine, via a converter housing 2/1.

The converter also has a stator 2/4 which rests on a free wheel 2/5 and a stator shaft. The impeller 2/3 and the stator 2/4 work together with a turbine wheel 2/2 in a hydrodynamic circuit.

A bridge clutch 1 is used to bridge the converter.

The bridge clutch 1 is composed of a carrier of the lining support or of the discs 1/1 which holds at least one lining support or one disc 1/5 between a clutch piston 1/2 and a converter housing 2/1. The disc carrier 1/1 is firmly connected with the turbine wheel 2/2. Thus, the turbine wheel 2/2, the carrier of the lining support or of the discs 1/1 and the lining support or the disc 1/5 have the same speed of rotation.

Friction linings 1/3, 1/4 can be placed on the lining support 1/5 on both sides or on the clutch piston 1/2 and the converter housing 2/1. In the lining support or in the disc 1/5 is at least one restrictor 1/6 of which at least one coincides with a groove in the friction lining.

FIG. 2

When the bridge clutch is engaged or a bridge clutch is loaded with slip, an oil current for cooling is supplied from outside through at least one outer lining groove 1/7, which is closed toward the inside, and passed through at least one restrictor 1/6 through the lining support or disc 1/5. On the other side of the lining support or of the disc 1/5, the oil is passed through an inner groove 1/8, in the second friction lining 1/4, which for example, is rotated by thirty degrees relative to the first friction lining 1/3, out from the lining support or out from the disc.

FIG. 3

Figure 1:
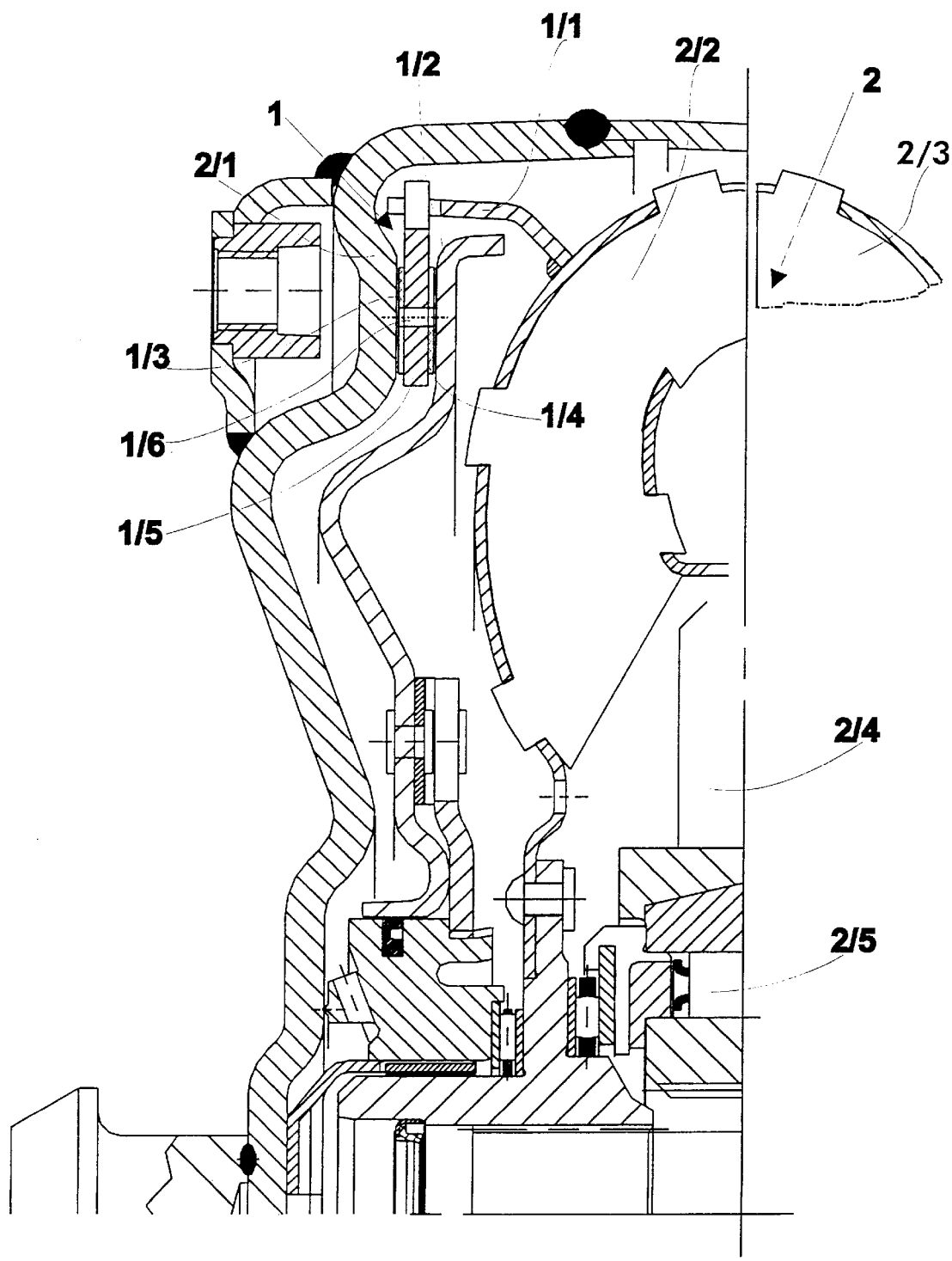
FIG. 1 is a total representation of a bridge clutch with a lining support or a disc in which there is a restricting point.
Figure 2:
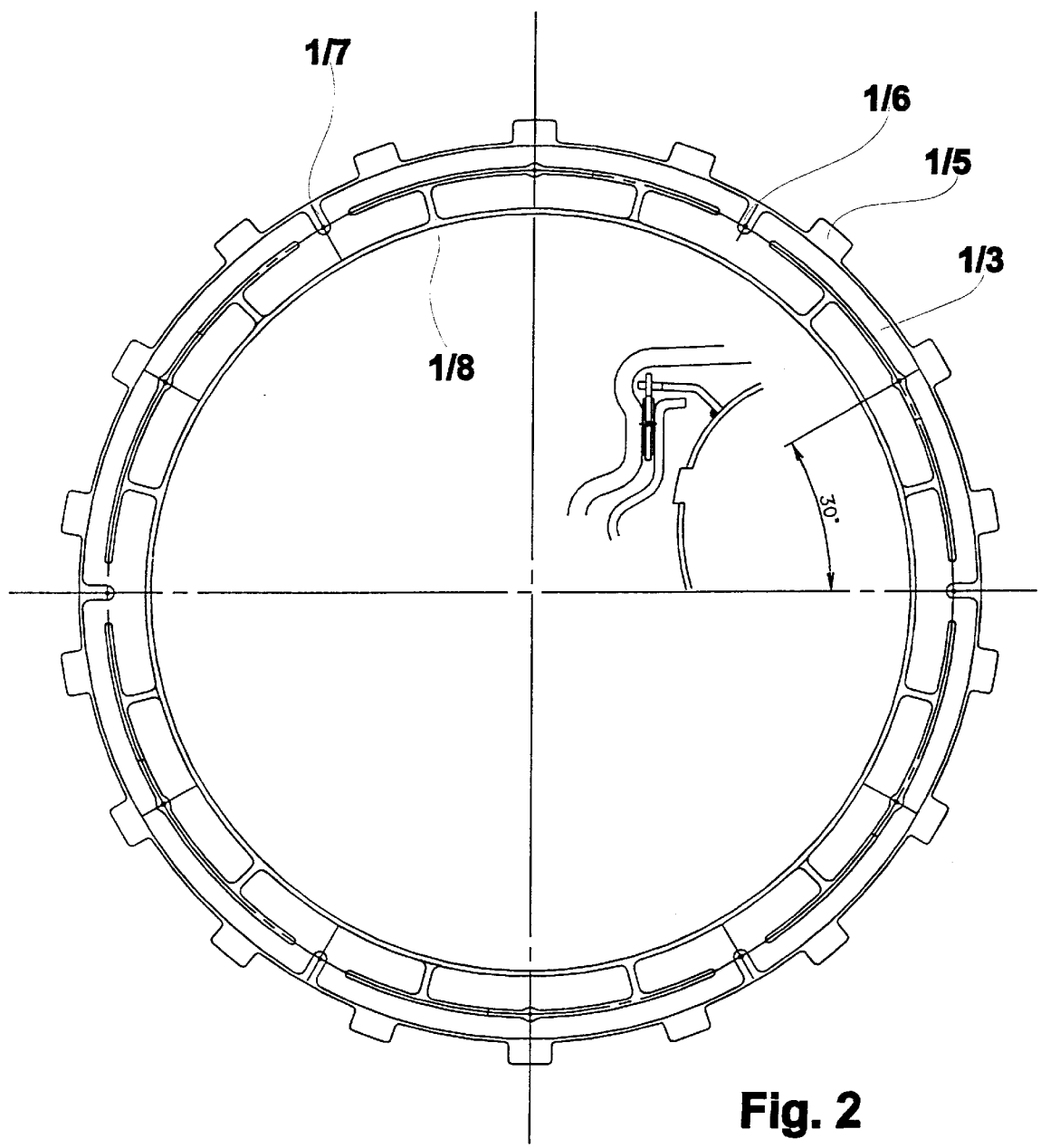
FIG. 2 is the representation of the structure of the friction lining used.
Figure 3:
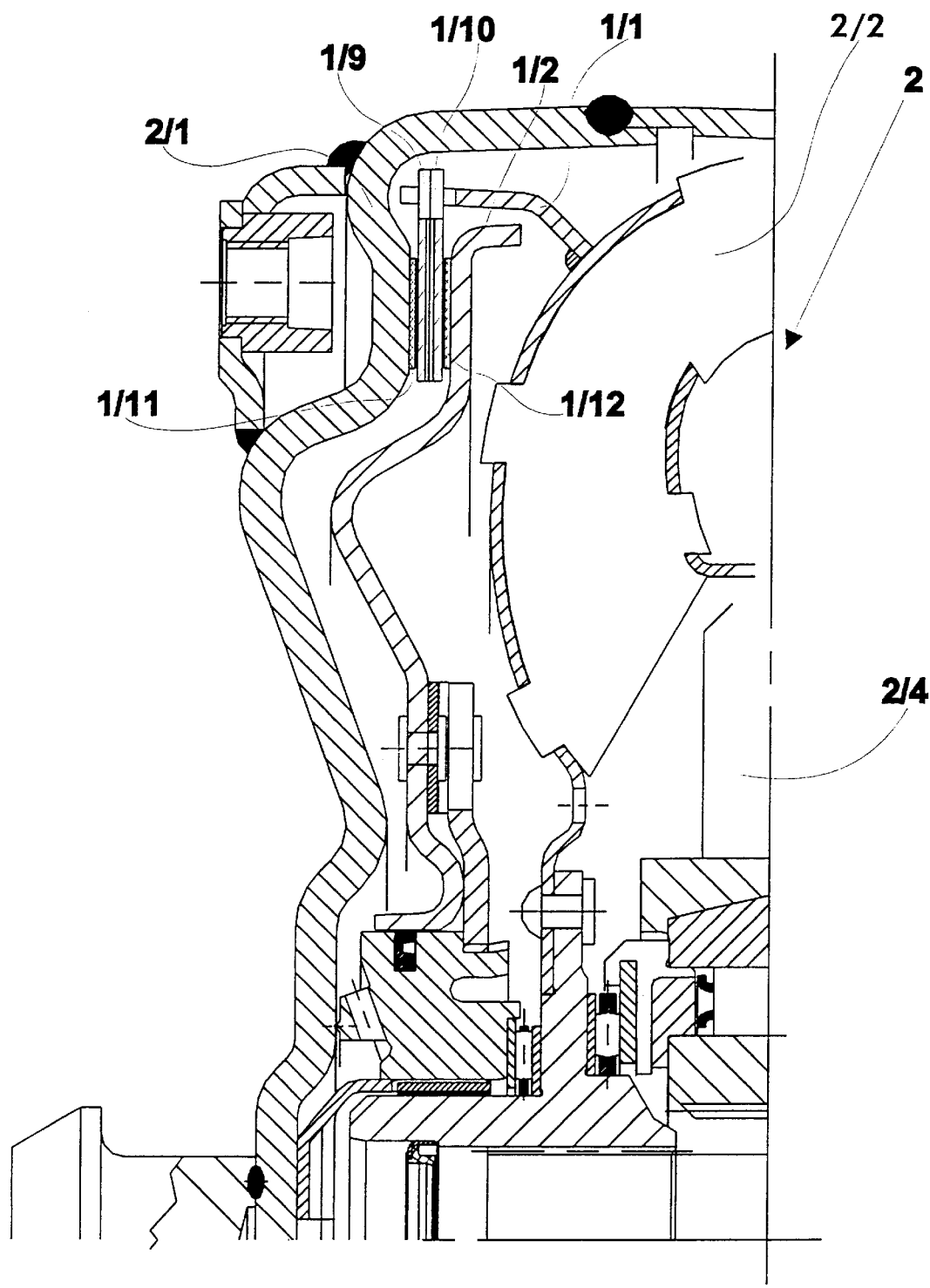
FIG. 3 is a total representation of a bridge clutch with discs which enclose an oil duct.
Figure 4:
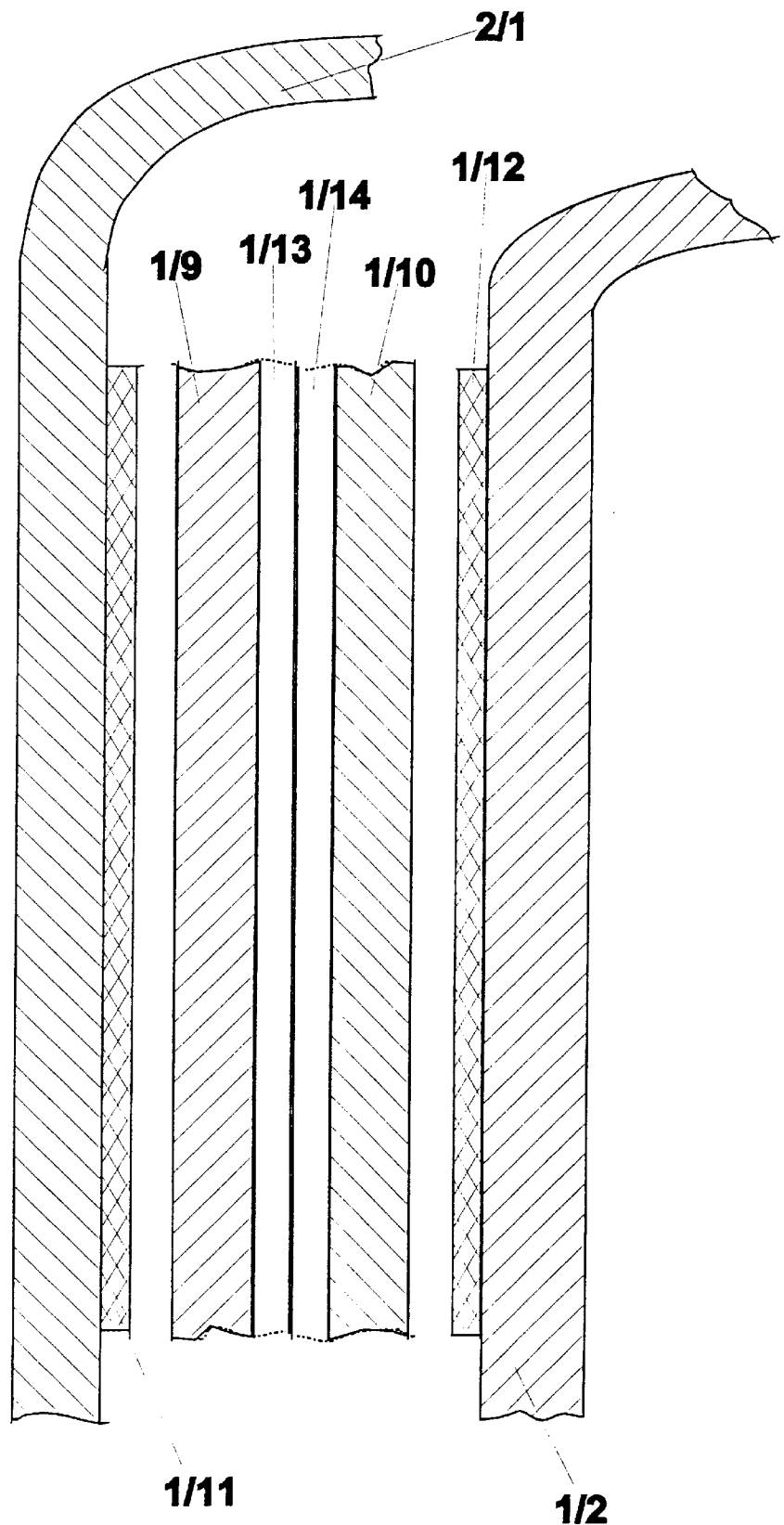
FIG. 4 is a section of the discs shown in FIG. 3.
Figure 5:
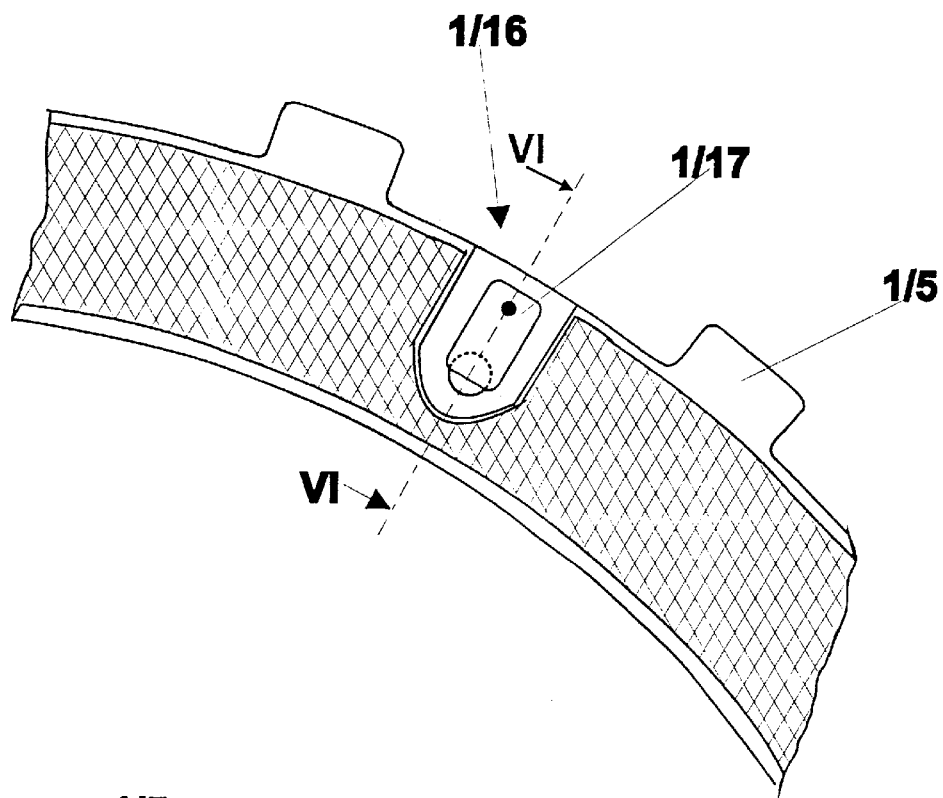
FIG. 5 shows a flow rate limitation.
Figure 6:
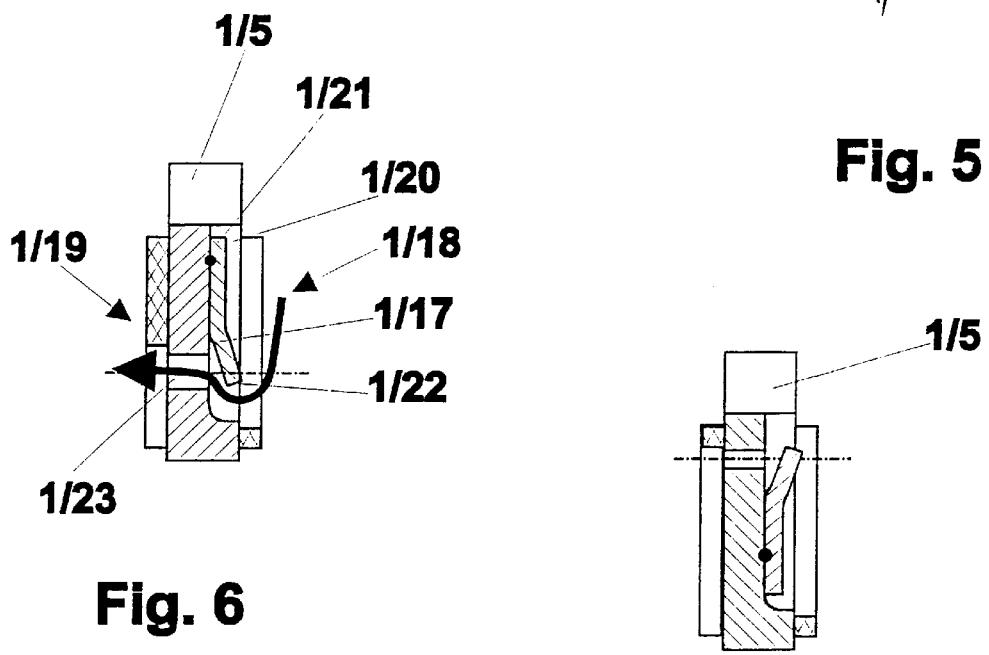
FIG. 6 is a section of the flow rate limitation.

FIG. 3 shows, the same as FIG. 1, a converter 2 with a turbine wheel 2/2, an impeller 2/3 and a stator 2/4. The difference consists in that at least two steel discs 1/9, 1/10 are secured, on one disc carrier 1/1, which do not move relative to each other and enclose between them at least one oil guidance system. Friction linings 1/11 must be placed upon the clutch piston 1/2 and upon the converter housing 2/1 in order that the heat from the steel discs 1/9, 1/10 can be passed, in the direction of the duct system, without being hindered by poor conductivity of the friction lining 1/11.

FIG. 4

Therefore, when the bridge clutch 1 is engaged or slipping, the oil current is passed through grooves 1/13, 1/14 to the steel discs 1/9, 1/10 to cool through the steel discs 1/9, 1/10. The grooves 1/13, 1/14 can be in both steel discs 1/9, 1/10 or only in one.

FIG. 5/FIG. 6/FIG. 7

At least one flow rate limitator 1/16, for example, in the form of a flat spring 1/17, is housed in the lining support or on the disc 1/5.

Figure 7:
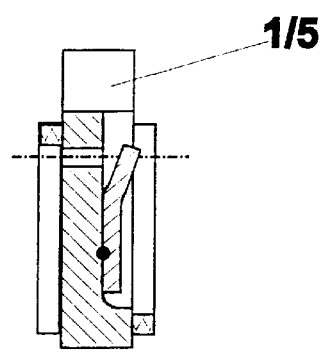
FIG. 7 is an alternative to FIG. 6.

The flat spring can be mounted in recesses 1/20 on the outer periphery on the oil feeding side 1/18 on the lining support or the disc 1/5 in a manner such that one end 1/21 is firmly connected with the lining support or the disc 1/5, for example, by spot welding or riveting, and the other, movable end 1/22 points in the direction of a through-aperture 1/23 in the lining support or the disc 1/5, and conditioned by a bend of the flat spring 1/17, be lifted around its transverse axis from the lining support or the disc 1/5. The flat spring 1/17 is mounted so that, when it has no bend, it partly covers the through-aperture 1/23. Alternatively, the fixed end 1/21 can be toward the edge or the center (see FIG. 7) of the lining support or of the disc 1/5. The flat spring 1/17 can be aligned radially, tangentially or in any desired direction.

If the pressure drop, dependent on the oil flow rate through the through-aperture 1/23 between oil feeding 1/18 and oil dissipating side 1/19 of the lining support or the disc 1/5, now increases, a force generates which acts upon the movable end 1/22 of the flat spring 1/17 in the direction of the lining support or disc 1/5 and thus wears away the through-aperture 1/23 near part of the cross section 1/24. The flow rate is thus limited at high pressures. In addition, the constantly open part of the cross section 1/24 of the through-aperture 1/23 ensures a minimal through flow of the clutch.

The flat spring 1/17 must be designed so that no step function generates. This would have a negative effect on the regulation of the clutch.

Therefore, a regulation of the flow rate which is independent of the speed and largely independent of the absolute pressure is achieved by such a construction. Also, almost no friction hysteresis appears in the flat spring 1/17 described, the construction is of reasonable cost, and high operational safety is achieved by the part cross section 1/24 of the through-aperture 1/23 always remaining open even when the flat spring 1/17 no longer opens the through-aperture 1/23. A minimal cooling is thus always ensured.

| Reference numerals | |
|---|---|
| Bridge Clutch | |
| 1 | whole bridge clutch |
| 1/1 | disc carrier |
| 1/2 | clutch piston |
| 1/3 | friction lining |
| 1/4 | friction lining |
| 1/5 | lining support or disc |
| 1/6 | restrictor |
| 1/7 | outer lining groove |
| 1/8 | inner lining groove |
| 1/9 | first steel disc |
| 1/10 | second steel disc |
| 1/11 | friction lining |
| 1/12 | friction lining |
| 1/13 | grooves in the first disc |
| 1/14 | grooves in the second disc |
| 1/16 | flow rate limitator |
| 1/17 | flat spring |
| 1/18 | oil feeding side |
| 1/19 | oil dissipating side |
| 1/20 | recess |
| 1/21 | fixed end of the flat spring |
| 1/22 | movable end of the flat spring |
| 1/23 | through-aperature |
| 1/24 | part cross section |

-continued

Reference numerals

Converter

| | |
|---|---|
| 2 | whole converter |
| 2/1 | converter housing |
| 2/2 | turbine wheel |
| 2/3 | impeller |
| 2/4 | stator |
| 2/5 | free wheel |

I claim:

1. A hydrodynamic converter (2) having a bridge clutch (1) and a converter housing (2/1) with said bridge clutch (1) comprising a clutch piston (1/2) and a disc (1/5), said disc (1/5) being located between said clutch piston (1/2) and said converter housing (2/1) and being connected with a turbine wheel (2/2) of said hydrodynamic converter (2), a first friction lining (1/3) being located between said converter housing (2/1) and one side of said disc (1/5) and a second friction lining (1/4) being located between said clutch piston (1/2) and an opposite side of said disc (1/5), said first and second friction linings (1/3, 1/4) each having ducts for guidance of oil flow, during operation of said hydrodynamic converter (2) and upon a pressure loading of said clutch piston (1/2), said disc (1/5) being surrounded by the oil flow and an operative connection forming between said converter housing (2/1) and said turbine wheel (2/2);

wherein said first and second friction linings (1/3, 1/4) are positioned relative to said disc (1/5) such that the oil current flows from one side of said disc (1/5) diametrically to the other side of said disc (1–5) through an aperture (1/23) formed in said disc (1/5), and a flow rate restrictor is located adjacent said aperture (1/23) for controlling the oil flow rate therethrough.

2. The hydrodynamic converter (2) with bridge clutch (1) according to claim 1, wherein said first and second friction linings (1/3, 1/4) have a uniform similar shape to one another.

3. The hydrodynamic converter (2) with bridge clutch (1) according to claim 2, wherein said first and second friction linings (1/3, 1/4) both a first set of grooves (1/7) which are open in a radial outward direction but are close in a radially inward direction, and have a second set of grooves (1/8) which are closed in a radial outward direction but are opened in a radially inward direction.

4. The hydrodynamic converter (2) with bridge clutch (1) according to claim 3, wherein said first and second friction linings (1/3, 1/4) of one pair of friction linings are mounted torsionally against each other.

5. A hydrodynamic converter (2) having a bridge clutch (1) and a converter housing (2/1) with said bridge clutch (1) comprising a clutch piston (1/2) and a disc (115), said disc (1/5) being located between said clutch piston (1/2) and said converter housing (2/1) and being connected with a turbine wheel (2/2) of said hydrodynamic converter (2), a first friction lining (1/3) being located between said converter housing (2/1) and one side of said disc (1/5) and a second friction lining (1/4) being located between said clutch piston (1/2) and an opposite side of said disc (1/5), said first and second friction linings (1/3, 1/4) each having ducts for guidance of oil flow, during operation of said hydrodynamic converter (2) and upon a pressure loading of said clutch piston (1/2), said disc (1/5) being surrounded by the oil flow and an operative connection forming between said converter housing (2/1) and said turbine wheel (2/2);

wherein said first and second friction linings (1/3, 1/4) are positioned relative to said disc (1/5) such that the oil current flows from one side of said disc (1/5) diametrically to the other side of said disc (1–5) through an aperture (1/23) formed in said disc (1/5), and a flow rate restrictor is located adjacent said aperture (1/23) for controlling the oil flow rate therethrough; and said first and second friction linings (1/3, 1/4) have different shapes from one another.

6. A hydrodynamic converter (2) having a bridge clutch (1) and a converter housing (2/1) with said bridge clutch (1) comprising a clutch piston (1/2) and a disc (1/5), said disc (1/5) being located between said clutch piston (1/2) and said converter housing (2/1) and being connected with a turbine wheel (2/2) of said hydrodynamic converter (2), a first friction lining (1/3) being located between said converter housing (2/1) and one side of said disc (1/5) and a second friction lining (1/4) being located between said clutch piston (1/2) and an opposite side of said disc (1/5), said first and second friction linings (1/3, 1/4) each having ducts for guidance of oil flow, during operation of said hydrodynamic converter (2) and upon a pressure loading of said clutch piston (1/2), said disc (1/5) being surrounded by the oil flow and an operative connection forming between said converter housing (2/1) and said turbine wheel (2/2);

wherein said first and second friction linings (1/3, 1/4) are positioned relative to said disc (1/5) such that the oil current flows from one side of said disc (1/5) diametrically to the other side of said disc (1–5) through an aperture (1/23) formed in said disc (1/5), and a flow rate restrictor is located adjacent said aperture (1/23) for controlling the oil flow rate therethrough; and said flow rate restrictor is at least one flat spring (1/7) which has one end thereof secured to said disc (1/5) adjacent said aperture (1/23) and a second end at least partially covering said aperture (1/23).

* * * * *